United States Patent
Bull et al.

(10) Patent No.: US 8,683,197 B2
(45) Date of Patent: Mar. 25, 2014

(54) METHOD AND APPARATUS FOR PROVIDING SEAMLESS RESUMPTION OF VIDEO PLAYBACK

(75) Inventors: William Bull, Campbell, CA (US); Kourtny Minh Hicks, Sunnyvale, CA (US); Aram Lindahl, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 1060 days.

(21) Appl. No.: 12/075,323

(22) Filed: Mar. 10, 2008

(65) Prior Publication Data

US 2009/0060472 A1 Mar. 5, 2009

Related U.S. Application Data

(60) Provisional application No. 60/967,563, filed on Sep. 4, 2007.

(51) Int. Cl.
*H04L 29/06* (2006.01)

(52) U.S. Cl.
USPC ............ 713/158; 713/155; 713/156; 713/157

(58) Field of Classification Search
USPC ........................................................ 386/124
See application file for complete search history.

(56) References Cited

U.S. PATENT DOCUMENTS

| | | | |
|---|---|---|---|
| 6,452,610 B1 * | 9/2002 | Reinhardt et al. | 715/716 |
| 8,004,617 B2 * | 8/2011 | Klebanov et al. | 348/730 |
| 2005/0066279 A1 * | 3/2005 | LeBarton et al. | 715/723 |
| 2005/0094031 A1 * | 5/2005 | Tecot et al. | 348/473 |
| 2007/0206926 A1 * | 9/2007 | Ando et al. | 386/95 |
| 2007/0294622 A1 * | 12/2007 | Sterner et al. | 715/716 |
| 2008/0092168 A1 * | 4/2008 | Logan et al. | 725/44 |
| 2009/0024923 A1 * | 1/2009 | Hartwig et al. | 715/716 |

* cited by examiner

*Primary Examiner* — Carl Colin
*Assistant Examiner* — John Elmore
(74) *Attorney, Agent, or Firm* — Schwegman Lundberg & Woessner, P.A.

(57) ABSTRACT

Video data files are provided to a user for playback. Once playback begins, the methods and apparatus of the present invention enable a user to interrupt the video playback function and quickly resume playback prior to reloading the selected video file. The techniques of the present invention can store video data in a cache memory and, upon interruption, capture a frame of video data at approximately the time of the interruption. The captured frame and cache data can be used to provide the user with a unique menu option for resumption of the video playback at the moment of interruption.

26 Claims, 4 Drawing Sheets

METHOD AND APPARATUS FOR PROVIDING SEAMLESS RESUMPTION OF VIDEO PLAYBACK

CROSS-REFERENCE TO RELATED APPLICATIONS

This claims the benefit of U.S. Provisional Application No. 60/967,563, filed Sep. 4, 2007, which is hereby incorporated by reference herein in its entirety.

BACKGROUND OF THE INVENTION

This invention relates to the playing video information on a portable, hand-held electronic device, and particularly to providing a user with a seamless return to the video playback after the user has stopped the video.

There are many portable electronic devices in use today, such as multi-media devices. Many of these devices are configured such that they can manage many different types of information, such as information personal contact information, e-mails, photos, songs, movie videos, TV shows, podcasts, etc. While these devices are capable of handling many different types of information and handling them correctly (e.g., the display of photos, playing back recorded video, playing audio tracks from songs, etc.), it is common for such devices to be single-task operated. In this manner, portable electronic media devices differ from computers, such as Apple Macintosh computers, which can perform numerous different functions simultaneously in different windows that are displayed to the user.

In connection with the fact that portable electronic media devices are configured to perform one task at a time for the user, portable electronic media devices can provide the user with access to a variety of different functions through a menu or series of menus. For example, a user might be playing back a movie and then decide to check e-mail, so the user exits the movie. However, the user then decides to continue playing the movie and attempts to return to where the user left off. Unfortunately, the user can often be left waiting for an agonizingly slow amount of time before the video playback program reloads and the movie returns to the frame or scene where playback had left off. For example, the time to reload and reconfigure can take up to 30 seconds under some circumstances, leaving a user very, very frustrated.

The user's experience with the device, therefore, is not a pleasant one. It is even more unpleasant if, for example, the user never intended to leave the movie, but instead merely touched the wrong input and exited the movie entirely by accident (imagine how the user might feel if watching an action/thriller and it's near the end of the movie when the exit button is accidentally touched).

SUMMARY OF THE INVENTION

In accordance with the invention, the user's experience is significantly improved by providing a portable electronic media device and method of operation in which the device keeps track of which scene was playing, regardless of whether the user exited intentionally or not, and uses that information to more rapidly resume playback if playback mode is selected.

The user experience can be enhanced, in accordance with the principles of the present invention, in one or more ways. In one way, the current frame and/or scene is stored in cache memory for as long as possible. Then, if the user returns to the movie, playback can begin in a much more rapid manner because the time to reload is significantly reduced. In another way, the frame that the user was watching when the video playback was interrupted can be displayed on the portable electronic media player so that the user knows exactly where playback ended and can be reminded to return to the video. The user can also be provided with the capability to pan the movie (i.e., move forward or backward, frame by frame) from the frame where it was interrupted, in a menu display window rather than in the movie window.

The user experience can also be enhanced by providing more than one of the features described above in a single portable electronic media device so that the interruption and resumption of movie playback can occur as seamlessly as possible. In this circumstance, the user can be provided with the capability to stop playback of a movie, execute another function on the portable media player, and return to the movie playback with little to no delay.

Various other alternative embodiments are possible.

In one alternative embodiment, the portable electronic media device is configured as a menu-driven device. The display, however, is configured to include a menu portion and a display portion. For example, when the device is turned on, a menu may be displayed on the left side of the display screen while a graphic image is displayed on the right side of the screen (persons skilled in the art will appreciate that the specific configuration of the menu portion and the graphic image can vary without departing from the spirit of the present invention). If the user had been watching a video, the menu portion of the display screen could include a menu entry such as "Now Playing" to indicate that a video has been paused. In addition, a frame of the video that was interrupted can be displayed on the graphic portion of the display screen. The menu entry and graphic image are displayed even though the user is not operating in the video program that runs on the device. For example, the addition of the "Now Playing" message and graphic image could be displayed as part of the top level menu on the portable media device (i.e., where the user selects which basic function to activate).

Therefore, in accordance with the present invention, there are provided methods for providing a user with an enhanced user experience when playing back video on a portable electronic media device. The user can interrupt the playback of the video and return to the video with little to no delay. This can be accomplished by, for example, caching a portion of the video that was being displayed prior to the interruption. This can also be provided by providing the user with a graphic image from the frame of the movie where the interruption occurred.

Media player apparatus operating in accordance with the methods is also provided.

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which.

DETAILED DESCRIPTION OF THE INVENTION

The invention will now be described in the context of a dedicated electronic media player which can be portable.

However, the invention applies to any electronic device capable of playing back video data files and performing at least one other unrelated function. For example, the techniques of the present invention are not likely to be advantageous to a dedicated video player, in which all of the components of that player are used to playback video. When video is interrupted under those circumstances, the user is likely to have selected "Pause" or "Stop" on a remote control device with the full intention of interrupting the video. If Pause was selected, that portion of the movie that was loaded into memory can stay in memory because the dedicated device has no other functions which would require access to that memory.

Figure 1:
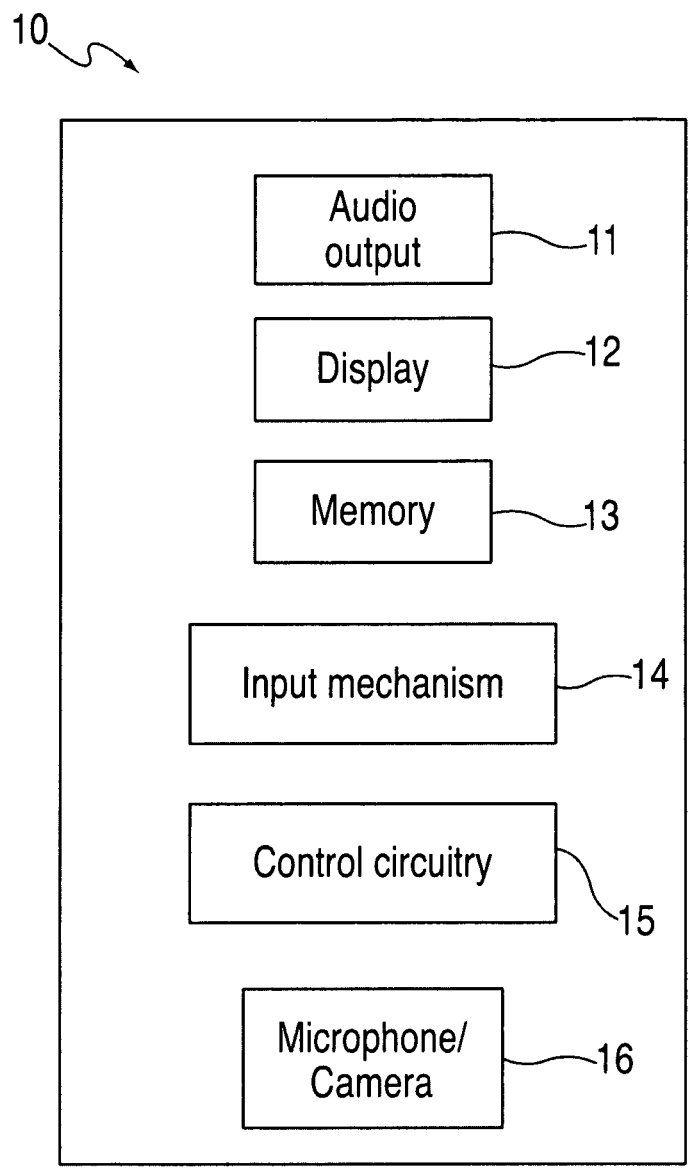
FIG. 1 is a block diagram of a media player which may incorporate the present invention.

FIG. 1 shows an electronic media player 10 which can incorporate the present invention. Media player 10, which can be portable, but need not be, includes an amount of memory 13 suitable for storing media content (e.g., in the gigabyte range). Memory 13 can include a main memory component and a cache memory component. The media content can include, for example, audio presentations or video presentations (which may include audio). Audio output 11 may include one or more speakers or headphone jacks (that can be coupled to headphones) for playing back audio content and/or the audio portion of video content. Display 12 allows the playback of the video portion of video content, and also serves as part of the user interface, displaying command menus, etc. In particular, display 12 can be the location where the display of menu driven commands and a graphic display of a frame from an interrupted movie can be displayed in accordance with the principles of the present invention.

Microphone and/or camera 16 can be provided to allow a user to capture live audio and/or video content for storage in memory 13, while input mechanism 14 provides a way to download or otherwise store content provided from elsewhere. Input mechanism 14 can include a connector for physical connection to another electrical device, such as a USB connector. Input mechanism 14 can also include one or more wireless inputs, such as a WIFI input and/or a Bluetooth input. It is also possible for input mechanism 14 to include a user command entry interface, including one or more buttons, dials, touchscreens or other controls on device 10 for interacting with control circuitry 15. Control circuitry 15 includes media playback software and/or circuitry for playing back content stored in memory 13. Control circuitry 15 also can include a processor (e.g., a microprocessor or microcontroller) for controlling the user interface, including the menus or other commands displayed on display 12, the processing of user inputs, and the control of whether or not cache memory gets flushed if a video playback is interrupted in accordance with the present invention.

Figure 2:
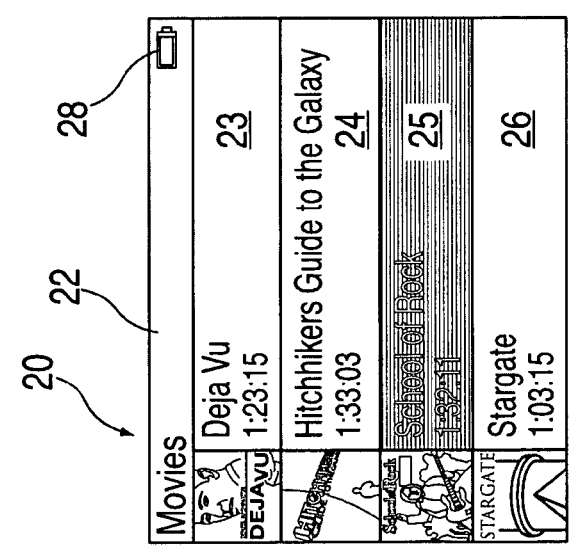

FIGS. 2-6 show various representative interface screens that can be utilized to provide the user with an enhanced user experience when playing back video files in accordance with the principles of the present invention. FIG. 2 shows screen image 20, that can be displayed on display 12, which includes menu bar 22 and menu options 23-26. Menu bar 22 can include text that describes the current function (such as the text "Movies" that is shown in FIG. 2) and also include one or more status icons, such as battery icon 28 (which currently indicates that the battery is not connected to a source of external power and is, therefore, being discharged). In this instance, screen image 20 includes four movie menu options, which are displayed to the user textually and graphically (in addition to the display of the length, in time, of each of the movies). Display screen 20 also, in this instance, indicates that the user is in the process of selecting the movie "School of Rock" for playback, as shown by the inverted display of text (i.e., the sole movie with white text on a dark background).

Figure 3:
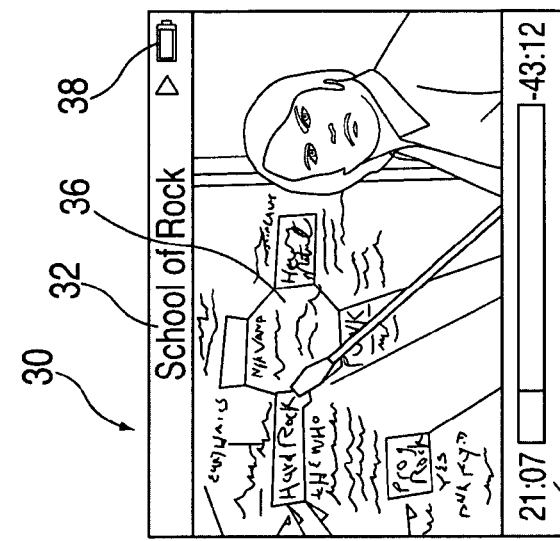

FIG. 3 shows screen image 30 that can be displayed on display 12 which indicates that the user had indeed selected "School of Rock", that can be displayed on display 12. Screen image 30 can include menu bar 32, status display portion 34 and graphic display portion 36. Menu bar 32, as described above with respect to menu bar 22, can also include one or more status icons, such as battery icon 38 (which currently indicates that the battery is not connected to a source of power and is still being discharged). Menu bar 32 now includes the title of the movie currently playing (i.e., "School of Rock"), as well as an additional functional icon related to the current status of the video playback (in this instance, a PLAY icon is shown which indicates that the video is playing).

Status display portion 34 can provide the user with status information related to the playback of the video file. The status information can be displayed using text, graphics or, as is shown in FIG. 3, both. In this instance, the user is provided with a wealth of information that is displayed in a non-obtrusive, subtle way. The user is provided with textual messages indicating how much of the movie has elapsed during playback as well as how much is remaining. The user is also provided with a graphic image that shows the same information in graphic format (i.e., a bar that fills in from left to right as the movie is played back.

Graphic image portion 36 is utilized by electronic media device 10 to display the video file to the user as it is played back. While screen image 30 shows menu bar 32 and status display portion 34, both of those images can fade off of the screen so that graphic portion 36 becomes a full screen image, if desired. In that instance, the user can be provided with the opportunity to select such an option, as well as to possibly select, for example, the amount of time that the menu and status bar remain on screen after the movie playback begins.

Figure 4:
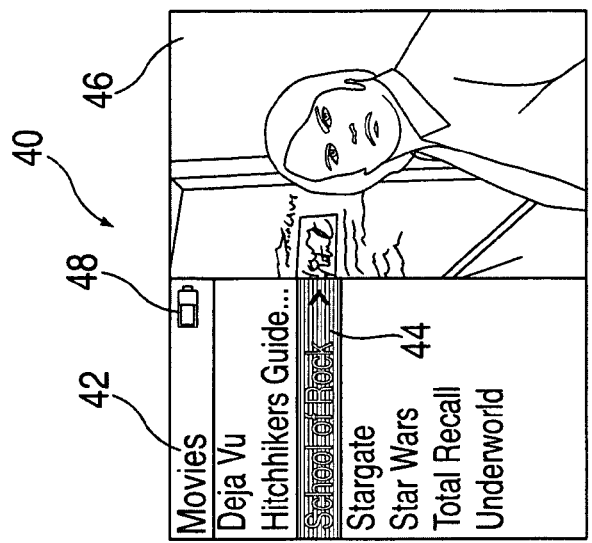
FIGS. 2-6 are depictions of representative user interface screens that can be utilized in accordance with the principles of the present invention.

FIG. 4 shows a screen image 40, that can be displayed on display 12, which includes menu bar 42, status menu 44 and graphic display portion 46. Menu bar 42, as set forth above, can also include one or more status icons, such as battery icon 48 (which currently indicates that the battery is not connected to a source of power and is still being discharged). Status menu 44, which is in essence a functional menu, includes a list of available movies including "School of Rock" which was previously being played (as shown by the inverted white text on a dark background). The user could select "School of Rock" again, a different movie, or the user could select a different function altogether.

Screen image 40, in accordance with the principles of the present invention, is the screen image that can be displayed to a user upon interruption of a video playback. As shown in FIG. 3, the graphic image displayed in video portion 46 is the frame of the video that was being played at the moment that playback was interrupted, even though the image is cropped, so that the user can quickly and easily see where the device is currently if playback mode is reselected. The user can be provided with screen image 40 if, for example, the user pauses the movie during playback and then selects the "Menu" option. In this instance, the user obtains a graphic image that, because it is significantly larger than the thumbnail normally provided at the movie selection menu (see menu option 25, in which a thumbnail graphic is utilized), provides the user with a richer and more useful experience. In addition, the user can also be provided with the capability to pan forward and backward, frame by frame, from the frame at which the movie playback was interrupted.

Figure 5:
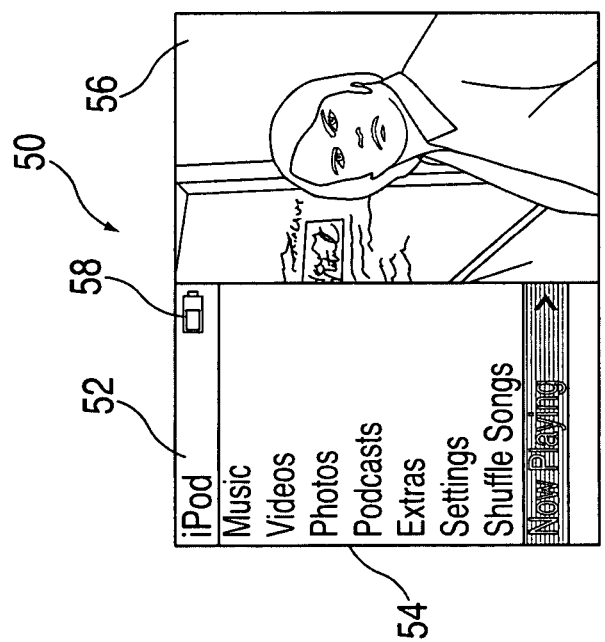

FIG. 5, in accordance with the principles of the present invention, shows a screen image 50 that displays the ability to return to a movie from a non-movie menu to a user. As in the images described above, screen image 50 includes menu bar 52, status menu 54 and graphic screen portion 56. Graphic screen portion icon 56, in this instance, is an actual image from the last frame that was displayed during movie playback (although it is a cropped image, since the display screen also is displaying the menus). It should be noted that menu bar 52 indicates that, in this instance, the media device (an ipod), is currently at its highest, most general level, in that there is no function currently selected. From this menu, for example, a user can choose from music, videos, photos, podcasts, etc.

There is, however, a different menu option that would not be available the first time the device is turned on after having been powered down. That menu option is "Now Playing," (which is shown in FIG. 5 as having been selected by the user via the inverted text (once again, white text on a dark/colored background)). If the user selects "Now Playing" from the menu, the device would then jump right to where the video playback was interrupted without any further inputs from the user. Moreover, in accordance with the principles of the present invention, that re-staring of the video playback occurs in an accelerated manner that is essentially seamless to the user.

Figure 6:
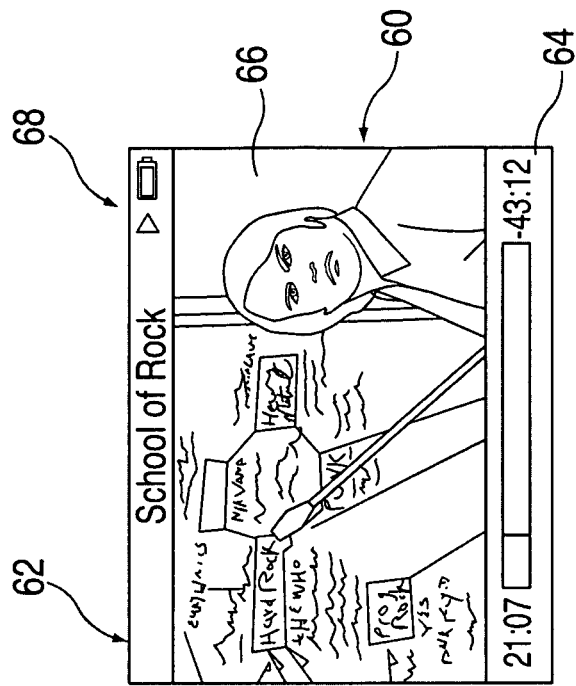

FIG. 6 shows screen image 60 which includes, among other things, menu bar 62, status region 64 and graphic region 66. Screen image 60 is virtually the same image as screen image 30 because it shows that the video playback has continued right where it had previously been interrupted (at elapsed time 21:07 of the playback).

Figure 7:
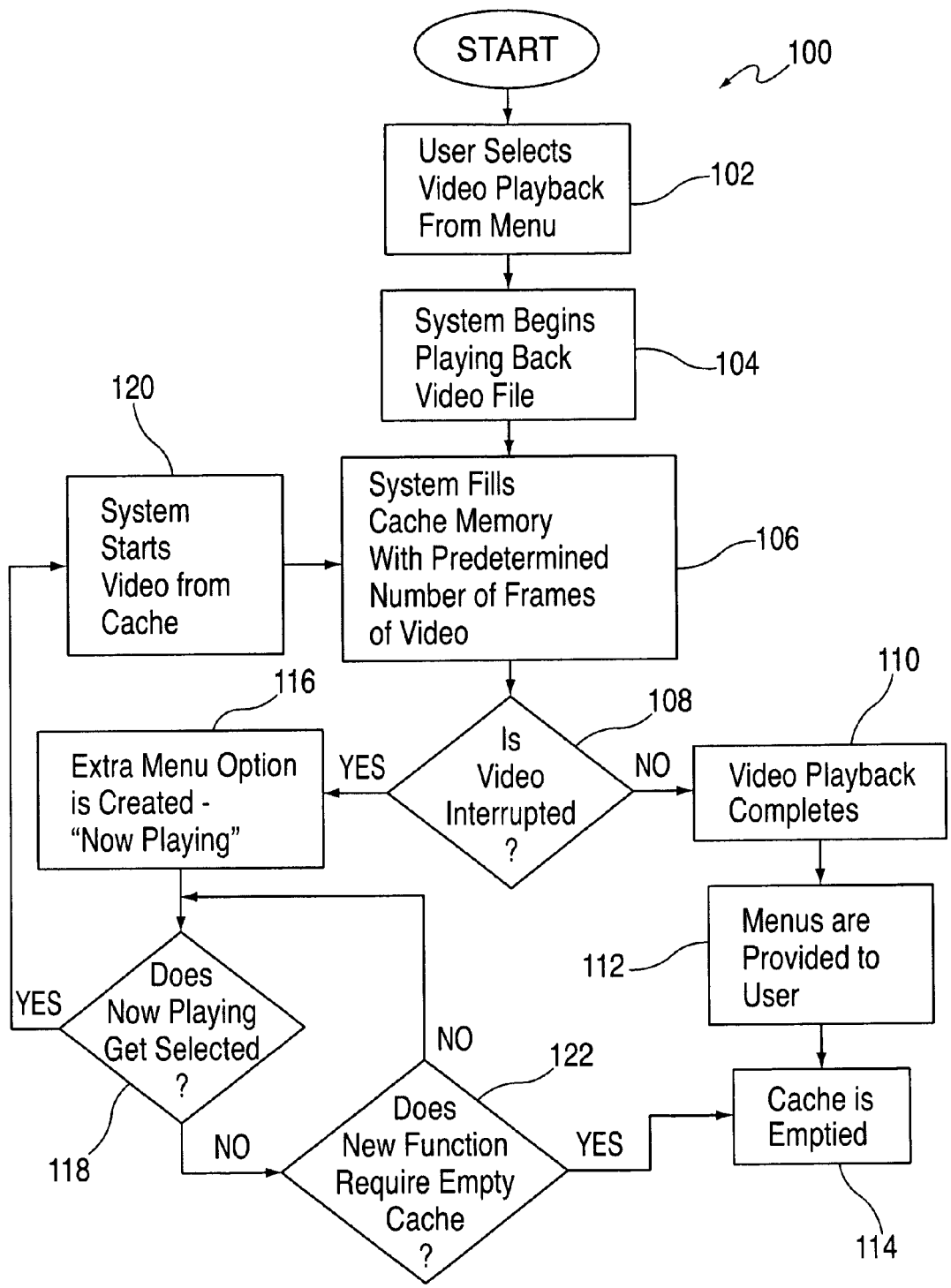
FIG. 7 is a flow diagram illustrating embodiments of the present invention.

One embodiment of providing a seamless user experience in restarting interrupted video playback in accordance with the present invention is shown in FIG. 7 in logical flow 100. The video playback process begins when a user selects a video for playback on an electronic device, such as a portable media player similar to media player 10, in step 102. The selection by the user may occur via one or more of a series of menu options (see, for example, FIGS. 5 and 2, in which the user could have selected "Videos" from the "iPod" menu, and then selected a movie from the Movie menu shown in FIG. 2).

Once the movie is selected, the device begins playing back the movie in step 104 using one or more known processes. The video playback process varies, however, in accordance with the principles of the present invention, in step 106, where the system fills a cache memory with a predetermined amount of video data. The predetermined amount will vary based on a number of factors, such as the size of memory 13 of the electronic device, the quality of the video (which affects the amount of data that must be stored for each frame of video data), the resolution and format of the output video (which again affects the amount of data stored for each frame of data), as well as the possibility of accepting user inputs on the selection via a settings menu option (not shown).

The video continues playing until one of two events occurs, either the video playback completes or it is interrupted, as is shown in step 108. If there is no interruption, the video playback completes in step 110, and control menus are, once again, presented to the user in step 112, so that the user is given the option to select a new (or the same) function for the device. In addition, because the video playback is now complete, the cache memory can be cleared in step 114.

If, on the other hand, the video playback is interrupted in step 108 (and the user has not simply "Paused" the video, but has triggered another event—either on purpose or accidentally), the user is provided an additional option that can be "Now Playing" or it can effectively be the same thing in step 116. For example, as shown in FIG. 5, a "Now Playing" option has been added to the basic, top-level, ipod menu. On the other hand, FIG. 4 shows that the same thing has occurred by the addition of a "full-size" image of a frame from approximately the point where the video playback was interrupted (by full-size, it is intended that the image be close to the same size it would be if it were displayed full screen, but at least larger than a thumbnail image). In the embodiment shown in FIG. 4, only the movie that was just interrupted will display a "full-size," mid-movie graphic in graphic portion 46.

Once the additional menu option is created (either directly or indirectly), the system monitors for whether it is selected in step 118. If the user decides to continue the video playback, step 120 starts the video playback from cache while the system reloads the video and associated software. Ideally, the amount of video stored in cache would be enough so that there is no noticeable difference to the user when the system transitions from cache playback to normal playback (in which case control in step 120 ends and control then begins again in step 106). However, persons skilled in the art will appreciate that circumstances may result in minor delays, in which case the video might appear to freeze to the user for an instant or two, and thus, such an implementation would still fall within the spirit of the present invention—a significantly reduced time to get the video playback up and running in the middle of a movie once that option is selected by the user.

If the user does not select to resume video playback, the system may be forced to write over the cache that is currently holding the portion of the video file to provide the quick-restart ability previously described. The system will try and protect the information stored in cache to provide the quick-restart ability, even if one or more other functions are requested. For this reason, it may be advantageous to select a predetermined size that is less than the entire cache. For example, if the user needs to check a phone number in the address book, such a request may only require a very small amount of cache memory (if any). Thus, the user could interrupt the movie playback, check a phone number, and return to the movie. In that instance, the system would, in step 122, check to see if cache needed to be emptied—and since it did not, control would return to step 118. Once the phone number was provided to the user, the user could then select resume video playback in step 118, which would restart the video playback from cache in step 120, etc.

Persons skilled in the art will appreciate that the present invention may be practiced through, for example, only the use of the direct "Now Playing" menu (i.e., the menu shown in FIG. 5), or only the indirect method (as shown in FIG. 4), without departing from the spirit of the present invention. In addition, there may also be additional or alternative ways to permit a user to restart the video playback from the middle of a video without requiring the wait for the traditional reload of the video playback system.

Thus it is seen that a method and/or apparatus for providing a user with the ability to restart playback of a video from some point in the middle of the video prior to the time required to reload the video data are provided. It will be understood that the foregoing is only illustrative of the principles of the invention, and that various modifications can be made by those skilled in the art without departing from the scope and spirit of the invention, and the present invention is limited only by the claims that follow.

What is claimed is:

1. A method of providing rapid resumption of a video file, comprising:

receiving a first user instruction to initiate the video playback of the video file;

in response to the received first user instruction, loading the video file into a main memory component;

after the loading, initiating the video playback of the video file by initially playing back the video file from the main memory component;

during the initially playing back the video file, loading a cache memory component with video frame data of the video file;

during the initially playing back the video file, receiving a second user instruction to interrupt the video playback of the video file and to access a non-video playback function;

subsequent to the received second user instruction, unloading at least a portion of the video file from the main memory component;

subsequent to receiving the second user instruction, providing access to the non-video playback function while preserving at least a portion of the video frame data loaded in the cache memory component;

after the providing, receiving a third user instruction to resume the video playback of the video file;

in response to the received third user instruction, initiating the resumption of the video playback of the video file by initially playing back the video frame data of the video file from the cache memory component;

during the initially playing back the video frame data, reloading the at least a portion of the video file into the main memory component; and after the reloading, playing back the video file from the main memory component.

2. The method of claim 1, further comprising, in response to the received first user instruction, loading a video playback program into the main memory component along with the video file.

3. The method of claim 2, wherein the initially playing back the video file from the main memory component comprises initially playing back the video file from the main memory component using the video playback program.

4. The method of claim 1, further comprising, during the initially playing back the video frame data, reloading the at least a portion of the video playback program into the main memory component.

5. The method of claim 4, wherein the playing back the video file from the main memory component comprises playing back the at least a portion of the video file using the video playback program.

6. The method of claim 1, wherein the playing back the video file from the main memory component comprises playing back the at least a portion of the video file.

7. The method of claim 1, further comprising seamlessly transitioning between the initially playing back the video frame data from the cache memory component and the playing back the video file from the main memory component.

8. The method of claim 1, further comprising capturing the frame of the video file being played back during the receiving the second user instruction.

9. The method of claim 8, wherein the providing access to the non-video playback function comprises displaying a menu that comprises at least a first menu option associated with the nonvideo playback function and a second menu option, wherein the second menu option comprises at least a portion of the captured frame.

10. The method of claim 9, further comprising, during the displaying the menu, receiving a fourth user instruction to pan the video file from the captured frame.

11. The method of claim 10, in response to the received fourth user instruction, altering the second menu option, wherein the altered second menu option comprises at least a portion of the video frame data from the cache memory component.

12. The method of claim 11, wherein the at least a portion of the video frame data comprises a frame of the video file that is one of forward and backward from the captured frame.

13. The method of claim 9, wherein the third user instruction comprises a user selection of the second menu option.

14. The method of claim 9, wherein the second menu option further comprises a textual message that indicates that the video playback may resume.

15. The method of claim 8, wherein the video frame data from the cache memory component comprises the captured frame.

16. An electronic device comprising:
a display;
an input mechanism;
a main memory component;
a cache memory component; and
a processor configured to:
receive from the input mechanism a first user instruction to initiate video playback of a video file;
in response to the received first user instruction, load the video file into the main memory component;
after the video file is loaded, initiate the video playback of the video file by initially playing back the video file from the main memory component on the display;
when the video file is being initially played back, load video frame data of the video file into the cache memory component;
when the video file is being initially played back, receive from the input mechanism a second user instruction to interrupt the video playback of the video file and to access a non-video playback function of the electronic device;
subsequent to the received second user instruction, unload at least a portion of the video file from the main memory component;
subsequent to receiving the second user instruction, provide access to the non-video playback function while preserving at least a portion of the video frame data loaded in the cache memory component;
once the access is provided, receive with the input mechanism a third user instruction to resume the video playback of the video file;
in response to the received third user instruction, initiate the resumption of the video playback of the video file by initially playing back the video frame data of the video file from the cache memory component on the display;
when the video frame data is being initially played back, reload the at least a portion of the video file into the main memory component; and
after the at least a portion of the video file is reloaded, play back the video file from the main memory component on the display.

17. The electronic device of claim 16, wherein the processor is further configured to:
in response to the received first user instruction, load a video playback program into the main memory component along with the video file; and
initiate the video playback of the video file by initially playing back the video file from the main memory component on the display using the video playback program.

18. The electronic device of claim 16, wherein the processor is further configured to seamlessly transition between initially playing back the video frame data from the cache memory component and playing back the video file from the main memory component.

19. The electronic device of claim 16, wherein the processor is further configured to capture the frame of the video file being played back when the second user instruction is received.

20. The electronic device of claim 19, wherein the processor is configured to provide access to the non-video playback function by displaying on the display a menu that comprises at least a first menu option associated with the non-video playback function and a second menu option, wherein the second menu option comprises at least a portion of the captured frame.

21. The electronic device of claim 20, wherein the processor is further configured to, while the menu is being displayed, receive from the input mechanism a fourth user instruction to pan the video file from the captured frame.

22. The electronic device of claim 21, wherein the processor is further configured to, in response to the received fourth user instruction, alter the second menu option, wherein the altered second menu option comprises at least a portion of the video frame data from the cache memory component.

23. The electronic device of claim 22, wherein the at least a portion of the video frame data comprises a frame of the video file that is one of forward and backward from the captured frame.

24. The electronic device of claim 20, wherein the third user instruction comprises a user selection of the second menu option.

25. The electronic device of claim 20, wherein the second menu option further comprises a textual message that indicates that the video playback may resume.

26. The electronic device of claim 19, wherein the video frame data from the cache memory component comprises the captured frame.

* * * * *